US009370969B2

(12) United States Patent
Kroening et al.

(10) Patent No.: US 9,370,969 B2
(45) Date of Patent: Jun. 21, 2016

(54) INDUSTRIAL CART WITH INTERCHANGEABLE ACCESSORIES

(71) Applicant: Greenlee Textron Inc., Rockford, IL (US)

(72) Inventors: John Wayne Kroening, Machesney Park, IL (US); Zachary Tate Lamoreux, Lanark, IL (US); Andrew M. Battermann, Loves Park, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 14/339,662

(22) Filed: Jul. 24, 2014

(65) Prior Publication Data

US 2015/0028616 A1    Jan. 29, 2015

Related U.S. Application Data

(62) Division of application No. 14/338,654, filed on Jul. 23, 2014.

(60) Provisional application No. 61/858,474, filed on Jul. 25, 2013.

(51) Int. Cl.
| | |
|---|---|
| *B60B 33/00* | (2006.01) |
| *B62B 3/10* | (2006.01) |
| *B62B 3/02* | (2006.01) |
| *B62B 3/04* | (2006.01) |

(52) U.S. Cl.
CPC ........... *B60B 33/0028* (2013.01); *B60B 33/001* (2013.01); *B60B 33/0002* (2013.01); *B60B 33/0018* (2013.01); *B60B 33/0023* (2013.01); *B60B 33/0026* (2013.01); *B62B 3/02* (2013.01); *B62B 3/04* (2013.01); *B62B 3/10* (2013.01); *Y10T 29/49826* (2015.01)

(58) Field of Classification Search
CPC .......... B62B 3/002; B62B 3/006; B62B 3/04; B62B 5/0083; B62B 33/0002
USPC ............... 280/47.34, 47.35, 79.4, 79.3, 79.11
See application file for complete search history.

(56) References Cited

U.S. PATENT DOCUMENTS

| | | | | |
|---|---|---|---|---|
| 637,650 | A * | 11/1899 | Northup | B62B 5/0083 280/79.11 |
| 2,779,049 | A * | 1/1957 | Hoddevik | B60B 33/06 16/34 |
| 2,790,196 | A * | 4/1957 | Rideout | B62B 5/0083 16/30 |
| 3,212,645 | A * | 10/1965 | Walden, Sr. | A01D 45/16 211/60.1 |
| 3,463,505 | A * | 8/1969 | Chervitz | B60B 33/0002 16/30 |
| 5,249,823 | A * | 10/1993 | McCoy | B62B 3/02 280/144 |
| 5,449,224 | A * | 9/1995 | Johnson | B62B 3/04 280/47.34 |
| 5,457,849 | A * | 10/1995 | Branson | B60B 33/04 16/19 |
| 6,116,533 | A * | 9/2000 | Elder | B65H 49/32 242/557 |
| 6,270,094 | B1 * | 8/2001 | Campbell | B62B 3/006 242/594.4 |
| 6,523,776 | B1 * | 2/2003 | Elder | B65H 49/325 211/85.5 |
| 7,185,899 | B2 * | 3/2007 | Thiede | A47B 46/00 211/189 |
| 7,249,738 | B2 * | 7/2007 | Kaczorowski | B60B 33/0002 248/129 |
| 8,302,258 | B2 * | 11/2012 | Lucci | E05D 13/1207 16/193 |
| 8,671,519 | B1 * | 3/2014 | Spraley | B60B 33/001 16/30 |
| 2003/0030239 | A1 * | 2/2003 | Woerner | B62B 3/002 280/47.35 |

(Continued)

*Primary Examiner* — Hau Phan
(74) *Attorney, Agent, or Firm* — Klintworth & Rozenblat IP LLC (57) ABSTRACT

An industrial cart has an accessory mounted thereon. A locking mechanism is provided for securing the cart and accessory together. The locking mechanism can be disengaged to remove the accessory from the cart.

31 Claims, 10 Drawing Sheets

(56) References Cited

U.S. PATENT DOCUMENTS

2003/0127815 A1* 7/2003 Hall .................... B60B 33/0002
280/79.3

2005/0015928 A1* 1/2005 Arsenault ........... B60B 33/0002
16/300

2005/0017470 A1* 1/2005 Abbott .................... B60P 3/122
280/79.4

* cited by examiner

INDUSTRIAL CART WITH INTERCHANGEABLE ACCESSORIES

This application claims the priority of U.S. provisional application Ser. No. 61/858,474, filed on Jul. 25, 2013 and is a divisional of application Ser. No. 14/338,654, filed on Jul. 23, 2014, which disclosure is herein incorporated by reference.

FIELD OF THE INVENTION

The present invention relates to the field of material handling, and specifically relates to an industrial cart used for transporting materials and tools throughout construction sites and work areas.

BACKGROUND OF THE INVENTION

Prior art industrial carts have been constructed to perform a single task, such as carrying a wire spool, holding pipe, tubing or conduit, or transportation of boxes of parts and tools. Often times, these carts have a limited useful time frame on a construction site. These carts are then relegated to a storage area to sit empty until the project reaches a phase where the cart becomes useful. This creates the need for contractors to maintain a large storage area for unused carts. These carts, while still functional, may become obsolete based on preference or market shifts on material usage. Furthermore, these carts do not disassemble easily for easy storage or maintenance.

An industrial cart is provided herein which provides improvements to existing structures and which overcomes the disadvantages presented by the prior art. Other features and advantages will become apparent upon a reading of the attached specification, in combination with a study of the drawings.

SUMMARY OF THE INVENTION

An industrial cart is provided for transporting materials and tools throughout construction sites and work areas. The industrial cart has an accessory mounted thereon. A locking mechanism is provided for securing the cart and accessory together. The locking mechanism can be disengaged to remove the accessory from the cart.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

An industrial cart 20 is provided which can be used in for electrical, plumbing, HVAC, industrial/MRO, construction, masonry, mining, military, and further reach, for general use of moving a vast range of materials. The cart 20 can be arranged to accept various accessories 222a-222f so that the cart 20 can be adjusted to the needed task. For example, the cart 20 can be arranged to hold a variety of materials, for example, but not limited to, wire spools, pipes, tubing or conduit, boxes of parts and tools. The accessories 222a-222f can be connected to the cart 29 without the use of tools and hardware. The cart 20 also includes quick-change casters 24 which facilitate the movement of the cart and which can be connected to the cart 20 without the use of tools and hardware.

The cart 20 has a flat steel frame 26 upon which the accessories 222a-222f and the casters 24 are mounted. The steel frame 26 includes first and second lateral support members 28a, 28b connected to or integrally formed with first and second longitudinal support members 30a, 30b. The frame 26 functions to provide structural rigidity and support for the cart 20. While the frame 26 is illustrated as being rectangular in shape, it is contemplated within the scope of the present invention that the frame 26 could be formed in numerous different shapes. Additionally, while the frame 26 in the preferred embodiment illustrated herein utilizes first and second lateral support members 28a, 28b and first and second longitudinal support members 30a, 30b, it is contemplated within the scope of the present invention that the frame 26 could utilize different quantities of lateral support members and/or longitudinal support members in order to create a frame 26 having a different shape.

Each lateral support member 28a, 28b has first and second ends; each longitudinal support members 30a, 30b has first and second ends. Each lateral support member 28a, 28b and each longitudinal support members 30a, 30b may be formed as an elongated conduit with a rectangular cross-section. The ends of the longitudinal support members 30a, 30b connect with the lateral support members 28a, 28b at a position spaced from the ends of the lateral support members 28a, 28b. This forms an extending portion 32a, 32b at each end of each lateral support member 28a, 28b.

As shown, spaced-apart intermediate lateral support members 34 are provided between the lateral support members 28a, 28b and connect at their ends to the longitudinal support members 30a, 30b. The intermediate lateral support members 34 provide a support structure for objects. The intermediate lateral support members 34 preferably have an upper surface that is spaced from the upper surfaces of the lateral support members 28a, 28b and longitudinal support members 30a, 30b, such that a recess 35 is provided into which a floor 37, see FIGS. 2 and 4 for example, can be seated. While spaced-apart intermediate lateral support members 34 are shown, a solid floor member could instead be provided.

A retaining block 40 extends from each longitudinal support members 30a, 30b at the ends thereof. The retaining block 40 is positioned proximate to, but spaced from, the respective extending portion 32a, 32b, such that a space 38 is formed between each retaining block 40 and the respective lateral support member 28a, 28b. The retaining block 40 is formed from a conduit having open ends which defines a passageway 44, and may have a rectangular cross-section. The outer surface of each retaining block 40 is preferably flush with the end of the respective extending portion 32a, 32b.

Figures 11, 11A:
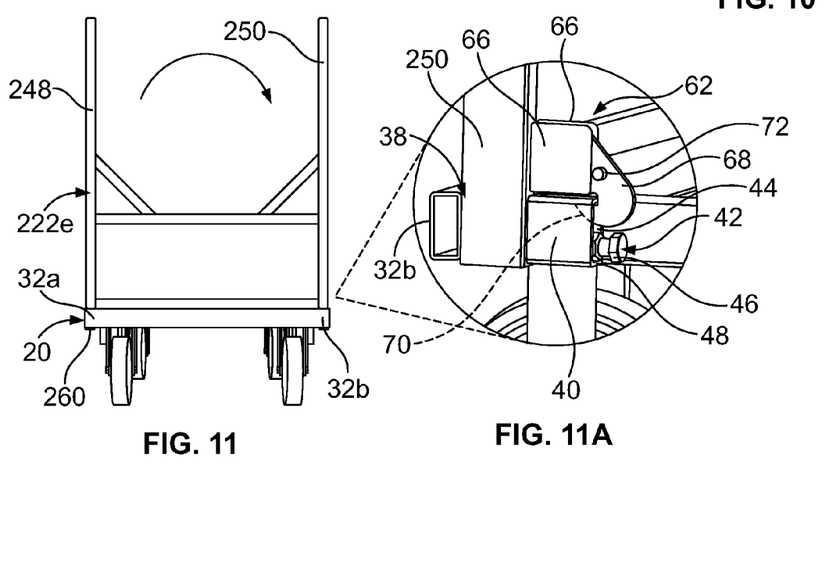
FIG. 11 is an end elevation view of the industrial cart with the accessory of FIG. 5 mounted thereto by a first embodiment of a locking mechanism.
FIG. 11A is an enlarged perspective view of a portion of FIG. 11.

Each retaining block 40 may hold a securing mechanism 42, as best shown in FIG. 11A. The securing mechanism 42 may include a fastener 46, such as a bolt, mounted through a member 48, such as a nut or a wall having a threaded aperture therethrough, which is attached to the retaining block 40 within the passageway 44. The fastener 46 can be turned relative to the member 48 and the retaining block 40 to move the free end of the fastener 46 toward or away from the space 38.

Example of accessories 222a-222f are shown in FIGS. 1-6. Each accessory 222a-222f includes at least first and second upright legs 248, 250 which are attached to each other by at least one cross leg 252. Each upright leg 248, 250 has a lower end and an upper end and may be formed of an elongated conduit with a rectangular cross-section. As shown in FIGS. 1A-1F, the upright legs 248, 250 may be of varying heights, dependent upon the accessory and its use. In each accessory 222a-222f, one upright leg 248 has a foot 260 provided at its lower end which extends perpendicularly from the upright leg 248, and the other upright leg 250 has a locking mechanism 62 attached thereto as described hereinbelow.

Figure 1:
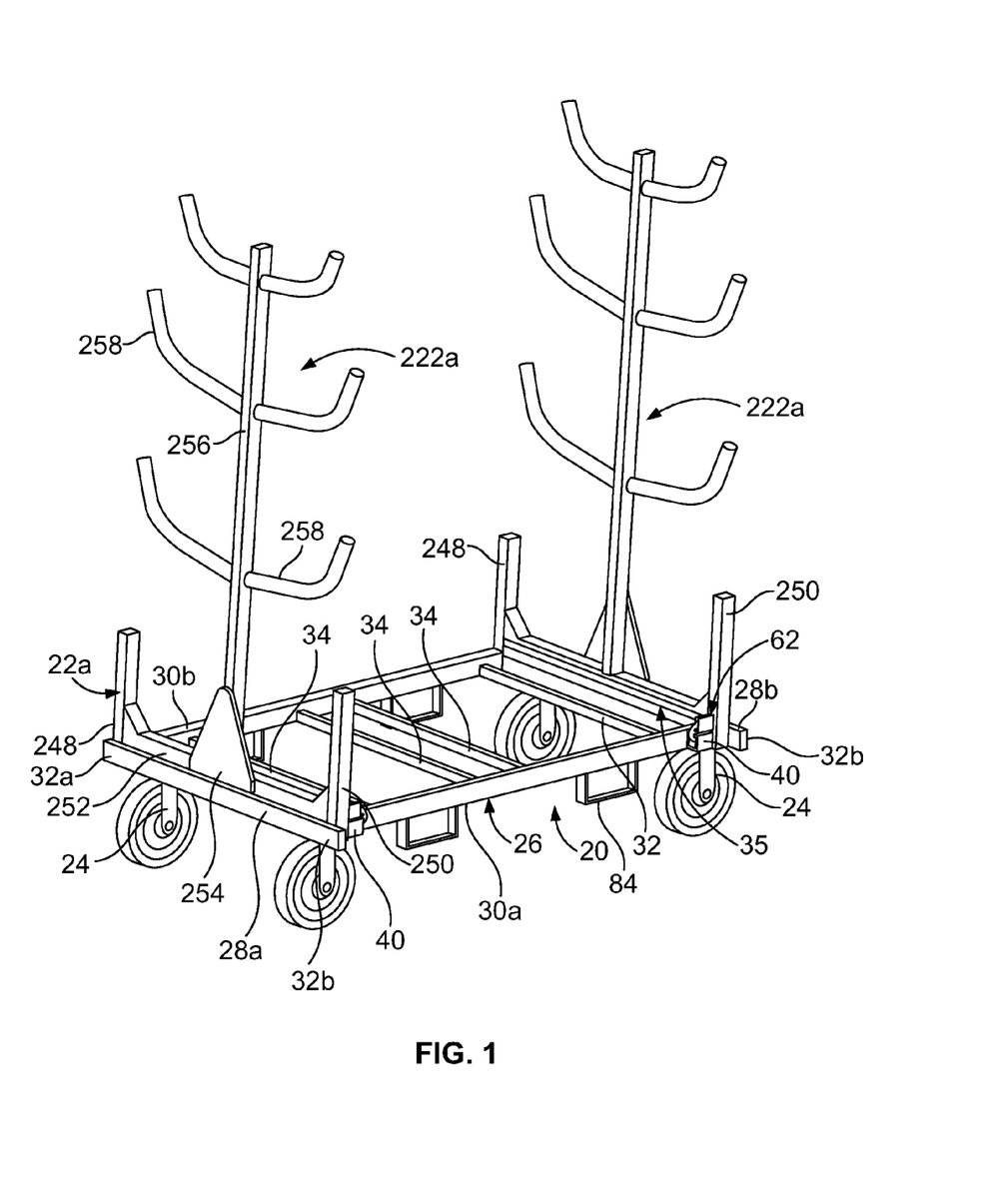
FIG. 1 is a perspective view of an industrial cart having a first accessory mounted thereto.

Attention is first invited to FIG. 1 which shows accessory 222a. In accessory 222a, the cross leg 252 is provided at the lower ends of the upright legs 248, 250. A triangular support 254 is provided at the midpoint of the cross leg 252 and supports an intermediate upright post 256. The post 256 has a plurality of arms 258 extending outwardly therefrom for hanging objects thereon.

Figure 2:
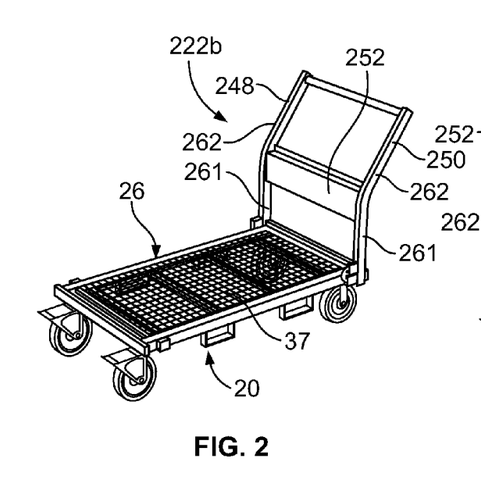
FIG. 2 is a perspective view of the industrial cart having a second accessory mounted thereto.

FIG. 2 shows accessory 222b. Each upright leg 248, 250 has a lower portion 261 which extends perpendicular to the frame 26 and an upper portion 262 which is angled relative to the lower portion 261. The cross leg 252 extends between the upright legs 248, 250 at the upper end of the lower portions 261. This accessory 222b acts as a pushing/pulling handle when attached to the cart 20.

Figure 3:
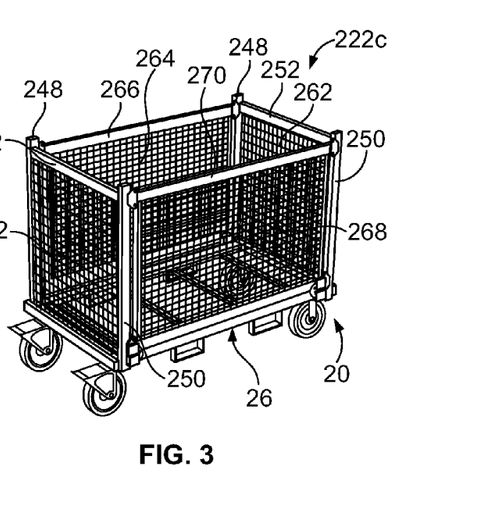
FIG. 3 is a perspective view of the industrial cart having a third accessory mounted thereto.

Accessory 222c is shown in FIG. 3. Two pairs of upright legs 248, 250 are provided and a cross leg 252 is provided at the top end of each pair of upright legs 248, 250. A mesh side 262 is provided between each set of upright legs 248, 250 and cross leg 252. A mesh side 264 with a top cross rail 266 is provided between the pair of upright legs 248; a mesh side 268 with a top cross rail 270 is provided between the pair of upright legs 250. This forms a basket structure.

Figures 4, 5:
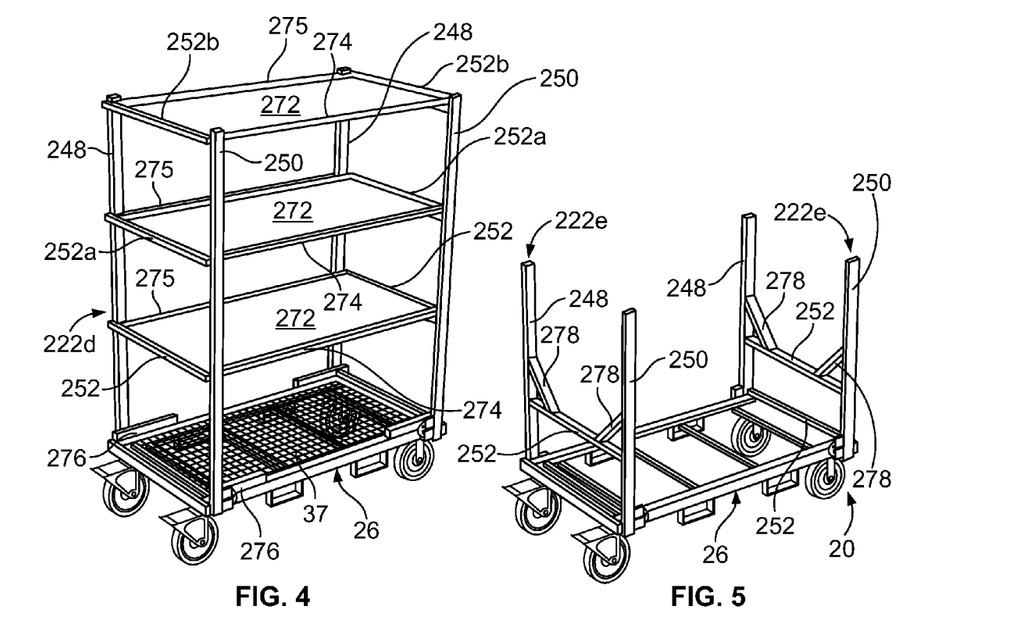
FIG. 4 is a perspective view of the industrial cart having a fourth accessory mounted thereto.
FIG. 5 is a perspective view of the industrial cart having a fifth accessory mounted thereto.

FIG. 4 shows accessory 222d. Two pairs of upright legs 248, 250 are provided and three cross legs 252, 252a, 252b are provided between each pair of upright legs 248, 250. The cross legs 252, 252a, 252b are spaced apart from each other along the upright legs 248, 250. A plate 272 with side cross rails 274, 275 is provided between the pairs of upright legs 248, 250 and forms a shelf with the respective cross legs 252, 252a, 252b. Each upright leg 248, 250 can have an arm 276 extending from the bottom end thereof which engages against the frame 26 to provide additional support and rigidity to the accessory 222d.

Attention is now invited to FIG. 5 which shows accessory 222e. The cross legs 252 are provided spaced from the lower ends of the uprights legs 248, 250. Support members 278 can be provided between the upper cross member 252 and the uprights legs 248, 250 to provide added rigidity to the accessory 222e.

Figures 6, 7, 8:
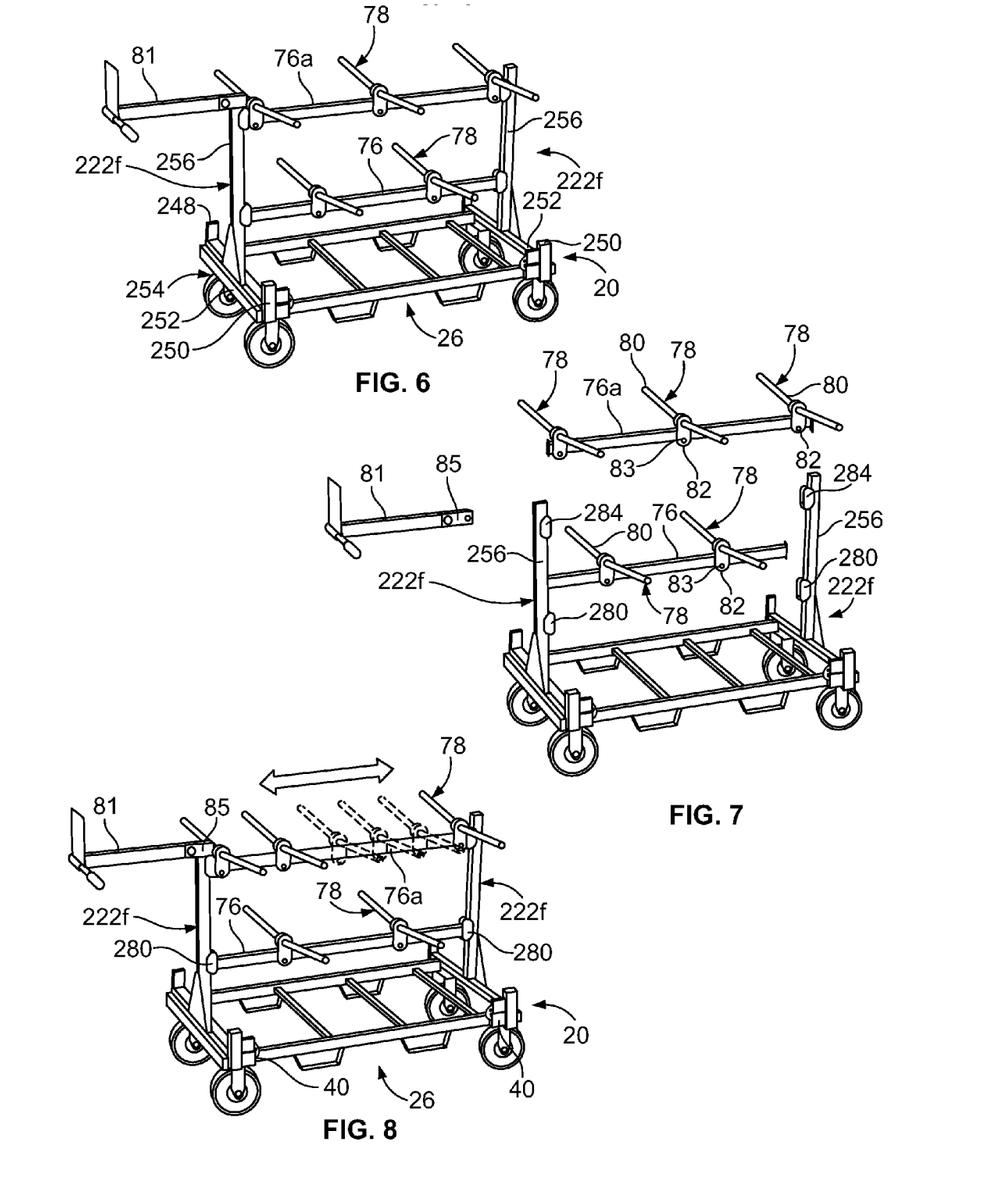
FIG. 6 is a perspective view of the industrial cart having a sixth accessory mounted thereto.
FIG. 7 is a perspective view of the industrial cart and accessory of FIG. 6, with the accessory partially disassembled from the cart.
FIG. 8 is a perspective view of the industrial cart and accessory of FIG. 6, showing the movement of a portion of the accessory relative to the cart.
Figure 9:
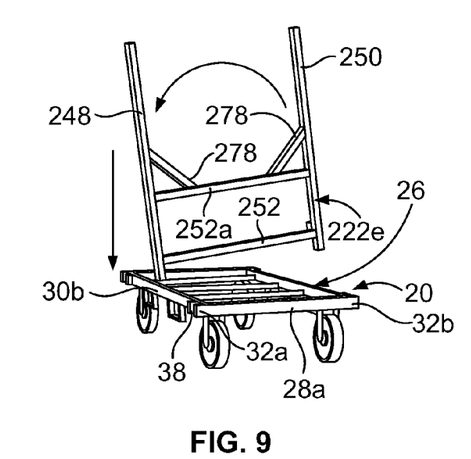
FIGS. 9 and 10 are perspective views of the industrial cart showing the accessory of FIG. 5 being mounted thereto.

Accessory 222f is shown in FIGS. 6-8. An accessory 222f is provided at each end of the cart 20. In each accessory 222f, like that of the accessory 222a, the cross leg 252 is provided at the lower ends of the upright legs 248, 250, and a triangular support 254 is provided at the midpoint of the cross leg 252 and supports an intermediate upright post 256. In each accessory 222f, the post 256 has a first mount 280 attached thereto, and a second mount 284 attached thereto, the mounts 280, 284 being spaced apart from each other on the post 256. The mounts 280 aligns with each other on the two posts 256; and the mounts 284 aligns with each other on the two posts 256. An associated rail 76 can have its ends seated in the mounts 280, such that the rail 76 spans the distance between the accessories 222f. An associated rail 76a can have its ends seated in the mounts 284, such that the rail 76a spans the distance between the accessories 222f. The rails 76, 76a are suitably attached to the mounts 280, 284, such as by fasteners extending through the rails 76, 76a and the mounts 280, 284, or the mounts 280, 284 can be formed as pockets into which the ends of the rails 76, 76a seat (the rails 76, 76a can have an enlarged foot at its end for this purpose).

A plurality of wire cart arms 78 can be mounted on each rail 76, 76a. Each wire cart arm 78 has a at least one tubular member 80 which extending from a mount which may be formed as a pair of flanges 82. When seated on the rail 76, 76a, the tubular member 80 engages the top of the rail 76, 76a and the flanges 82 seat on either side of the rail 76, 76a and extend downwardly therefrom. A fastener 83 may be seated through aligned apertures in the flanges 82 to secure the wire cart arm 78 to the rail 76, 76a. This type of wire cart arm 78 is suitable for holding a variety of objects, such as wire spools. The wire cart arm 78 can be slid along the length of the rail 76, 76a as desired to provide for flexible mounting of objects to the cart 20. For example, the wire cart arm 78 fully adjust along the rails 76 to accommodate various wire spools. Current carts have fixed arms and therefore a fixed limit to accommodating various spool sizes. While there are two wire cart arms 78 shown in rail 76 and three wire cart arms 78 shown on rail 76a in FIGS. 6-8, more or less wire cart arms 78 can be provided on each rail 76, 76a. In addition, while two rails 76, 76a and their associated mounts 280, 284 are shown in FIGS. 6-8, more or less than two can be provided.

A rotatable handle 81 can be attached to one of the accessories, shown as accessory 222f in FIGS. 6-8, to enable a user to push or pull the cart 20. The handle 81 is suitably secured to the upright post 256, for example by fasteners, and may have a pocket 85 into which the post 256 is inserted.

As best shown in FIG. 11A, the locking mechanism 62 has a pair of spaced apart flanges 66 extending outwardly from the leg 250 and which are spaced from the lower end of the leg 250, and a hook member 68 is mounted between the flanges 66 by a pivot pin such that the hook member 68 is rotatable relative to the flanges 66. The hook member 68 has a hook end 70. A stop 72 extends outwardly from one side of the hook member 68. A spring (not shown), biases the hook member 68 into a downward position (the position where the hook end 70 is below the flanges 66); the stop 72 prevents the hook member 68 from rotating too far below the flanges 66.

Figure 10:
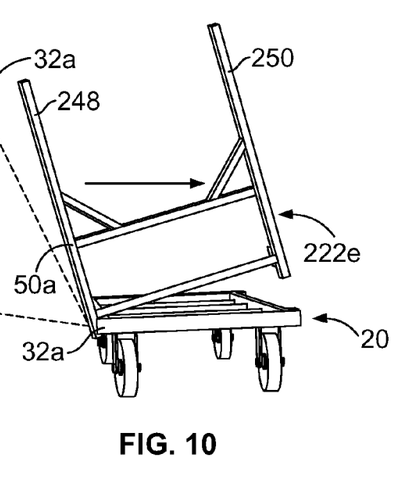
Figure 10A:
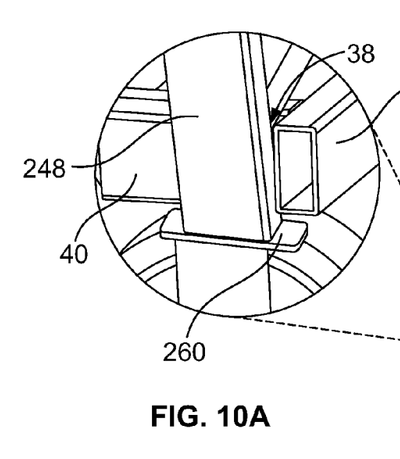
FIG. 10A is an enlarged perspective view of a portion of FIG. 10.
Figure 11B:
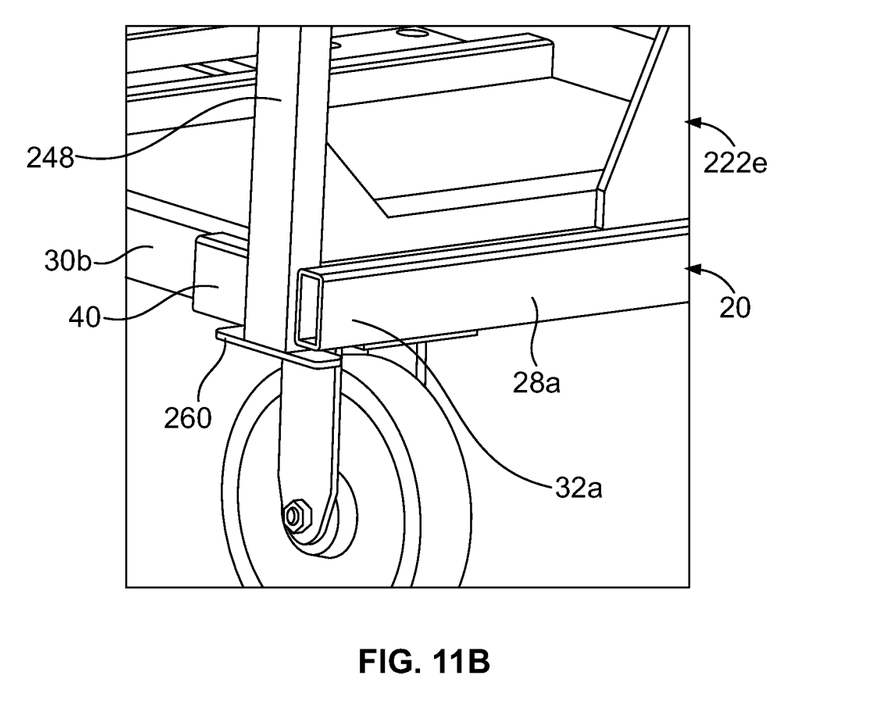
FIG. 11B is an enlarged perspective view of another portion of FIG. 11.

To attach the accessory 222a-222f to the frame 26, the accessory 222a-222f is positioned relative to the frame 26 at a slight angle to the side where leg 248 with the foot 260 is provided, as shown in FIGS. 10 and 10A. The leg 248 seats in the space 38 with the foot 260 below the extending portion 32a and the retaining block 40. As shown in FIGS. 11-11B, the accessory 222a-222f is rotated down toward the opposite side of the frame 26. This causes the other upright leg 250 (without a foot) to enter into the space 38 on the opposite side of the frame 26. As the leg 250 enters the space 38, the hook end 70 engages with the upper end of the retaining block 40 and rotates upwardly. When the leg 250 is fully seated in the space 38, the hook member 68 rotates downwardly to engage the hook end 70 into the passageway 44 and engage the retaining block 40. This locks the accessory 222a-222f to the frame 26. The accessories 222a-222f provide for a hardware-free assembly which results in faster change-out without lost parts. The structural design of this assembly allows a strong, durable interface and a positive lock. The foot 260 slides under the mating features (below the respective extending portion 32a and the retaining block 40) on one side of the cart 20 to aid in the stability of the assembly. The locking mechanism 62 allows for sturdy support and added safety to avoid inadvertent release of the accessories 222a-222f and possible discharge of a possible heavy load.

For a solid feel, the fastener 46 can be tightened to abut the free end of the fastener 46 against the respective upright leg 248, 250, however, this is not necessary.

The foot 260 can be eliminated on the leg 248 and instead a locking mechanism 62 can be provided on the leg 248 (as well as on leg 250). With this configuration, the accessory 222a, 222f is lifted above the cart 20 and inserted downwardly into the spaces 38. The locking mechanisms 62 on each leg 248, 250 engage with retaining blocks 40 as described herein.

Figure 12:
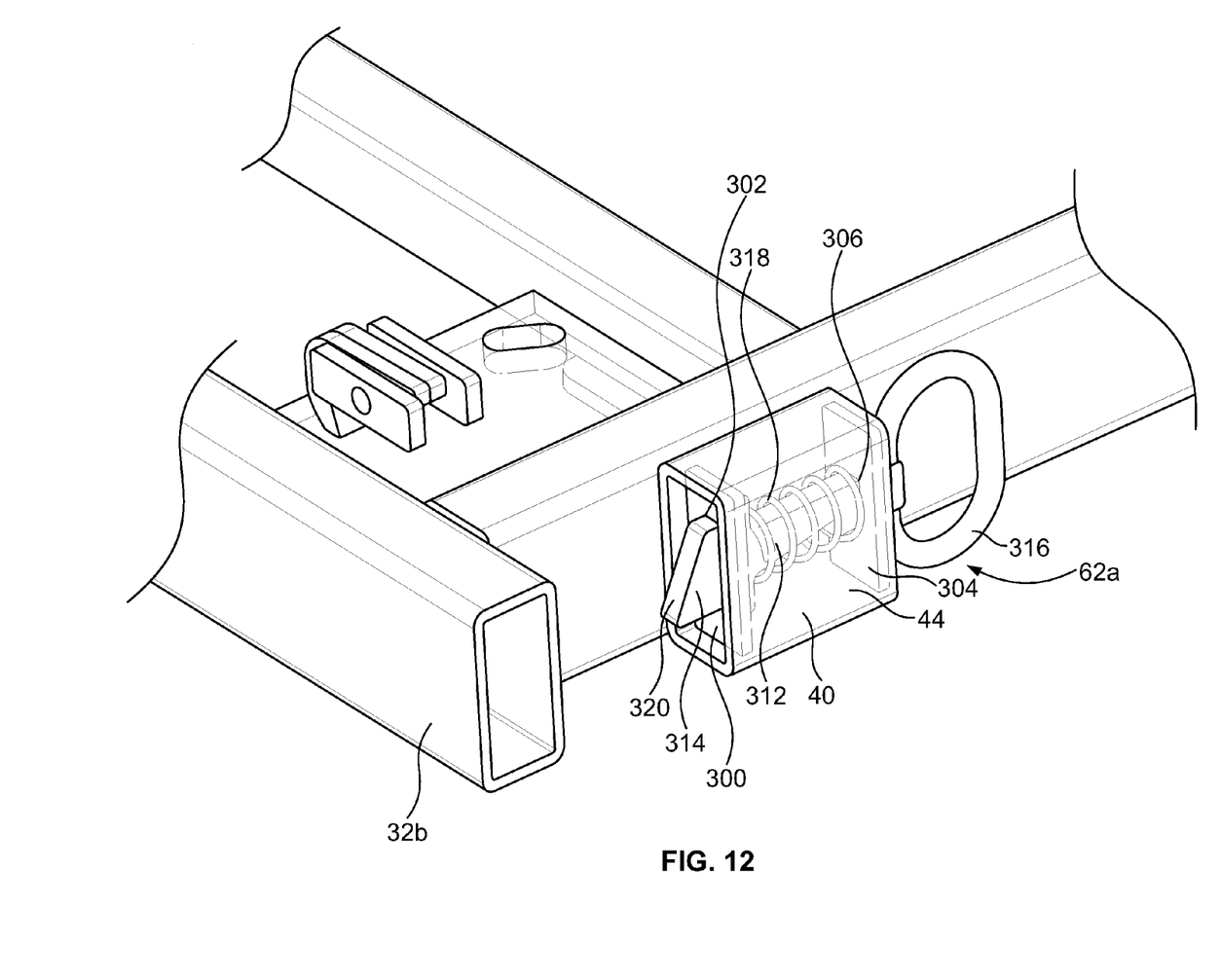
FIG. 12 is a perspective view of an alternate locking mechanism which can be provided on the industrial cart.

An alternative locking mechanism 62a is shown in FIG. 12 and which extends through the retaining block 40. The retaining block 40 has a first end wall 300 provided therein which has a central slot 302, and a second end wall 304 which has an aperture 306 therethrough. The locking mechanism 62a includes a retractable pin 310 which extends through the slot 302 and the aperture 306. The pin 310 has a shaft 312 having an enlarged end 314 at one end thereof and a handle 316 at the other end thereof. The handle 315 is proximate to the second end wall 304, the shaft 302 extends through the aperture 306 in the second end wall 304 and through the passageway 44 in the retaining block 40, and the enlarged head 314 extends through the slot 302 in the first end wall 300. A spring 318 is positioned around the shaft 312 between the enlarged head 314 and the end wall 304. The enlarged head 314 has an tapered surface 320 on its upper surface.

To use the alternative locking mechanism 62a to attach the accessory 222a-222f to the frame 26, the accessory 222a-222f is positioned relative to the frame 26 at a slight angle to the side where leg 248 with the foot 260 is provided, as shown in FIGS. 10 and 10A. The leg 248 seats in the space 38 with the foot 260 below the extending portion 32a and the retaining block 40. The accessory 222a-222f is rotated down toward the opposite side of the frame 26 like that shown in FIGS. 11 and 11A. This causes the other upright leg 250 (without a foot) to enter into the space 38 on the opposite side of the frame 26. As the leg 250 enters the space 38, the end of the leg 250 engages the tapered surface 320 and causes the pin 310 to move toward the wall 304. As the leg 250 moves downwardly, the end of the head 314 bears against the side wall of the leg 250 to secure the leg 250 in place. The spring 318 causes the pin 310 to bear against the leg 250 with sufficient force to prevent the inadvertent removal of the leg 250 from the locking mechanism 62a. This locks the accessory 222a-222f to the frame 26. The accessories 222a-222f provide for a hardware-free assembly which results in faster change-out without lost parts. The structural design of this assembly allows a strong, durable interface and a positive lock. The locking mechanism 62 allows for sturdy support and added safety to avoid inadvertent release of the accessories 222a-222f and possible discharge of a possible heavy load.

To release the pin 310 from the leg 250, the handle 316 is pulled to retract the head 314 away from the leg 250 so that the leg 250 can be lifted away from the cart 20.

The leg 250 may be modified to provide a slot (not shown) into which the head 314 extends to further secure the locking mechanism 62a to the leg 250.

The foot 260 can be eliminated on the leg 248 and instead a locking mechanism 62a can be provided on the leg 248 (as well as on leg 250). With this configuration, the accessory 222a, 222f is lifted above the cart 20 and inserted downwardly into the spaces 38. The locking mechanisms 62a on each leg 248, 250 engage with retaining blocks 40 as described herein.

Alternatively, one leg may having locking mechanism 62 provided thereon, and the other leg may have locking mechanism 62a provided thereon.

As such, the cart 20 has integrated features in each corner that allow a family of accessories 222a-222f to interconnect through mating geometries and locking components for a positive interface. While this may be accomplished in many variations of mating geometries, the design of integrating the mating geometry into the legs 248, 250 of the accessories 222a-222f and maintaining a compact interface on the frame 26 gives additional functionality to the cart 20 as a flat material cart. The cart 20 is flat when the accessories are not attached thereto. As such, the cart 20 provides a versatile platform of interchangeable accessories 222a-222f that allows the cart 20 to adjust to the work environment and task. The accessories 222a-222f can be easily adjusted to accommodate a wide variety of materials.

The cart 20 can include other mounts thereon, such as mounts 84 extending downwardly from the longitudinal support members 30a, 30b.

The quick-change casters 24 can be easily exchanged to perform in a large range of environments. The casters 24 are secured to the frame 26 at any position where there are three adjacent support members as described herein, and may be secured proximate each corner of the cart 20. The caster 24 are manufactured from at least one conventional caster type wheel 86 connected to a caster plate 88 via a swivel connection 90 that provide swivel functionality in order to assist in the easier movement of the cart 20. The caster plate 88 has an upper planar surface and a lower planar surface. For example, the caster 24 can be positioned proximate to the corner provided by lateral support member 28a, longitudinal support member 30a and intermediate lateral support member 32; it is to be understood that the caster 24 can be positioned anywhere along the frame 26 where three of the members are adjacent to each other. In the prior art, mounting and changing casters is a difficult task with standard mounting hardware and often a useable cart will remain unused because of a damaged caster. With the present quick-change casters 24, exchange will help keep the cart 20 in useable condition.

The frame 26 includes a caster mounting interface 92 which allows for easy insertion and removal of the caster 24 as described herein. This caster mounting interface 92, along with the flat caster plate 88 on the caster 24 which provides a caster mating interface, allows for an indeterminate amount of variations and combinations of carts 20 as well as extensions, additions and the ability to join more than one cart 20 together for longer materials. In each embodiment, the caster 24 simply slides into the caster mounting interface 92 and is secured thereto.

Various embodiments of the caster mounting interface 92 are shown in FIGS. 13-20. In each embodiment, the caster mounting interface 92 includes a three-sided pocket 100 into which the caster plate 88 seats, and a locking mechanism which engages with the caster plate 88 to secure said caster plate 88 within the pocket 100. In each embodiment, the locking mechanism includes a member 104, 108, 116, 120, 132, 146, 148 capable of being moved to an upper position where the member 104, 108, 116, 120, 132, 146, 148 does not interfere with insertion of the caster plate 88 into the pocket 100 or capable of being moved to a lower position which is proximate to the caster plate 88 such that the member 104, 108, 116, 120, 132, 146, 148 is capable of being engaged with the caster plate 88.

The pocket 100 is formed from a plurality of walls. As shown in the drawings, the walls are formed of a flat mounting plate 94, a pair of mounting rails 96, 98, and a portion of the frame 26 as described herein. Alternatively, the walls of the pocket 100 can be formed of the flat mounting plate 94, at least one side plate (not shown) extending downwardly from the mounting plate 94 to the pair of mounting rails 96, 98 attached to a lower portion of the at least one side plate; and the pocket 100 is attached to the frame 26.

The mounting plate 94 has a planar upper surface, a lower surface which is preferably planar, and at least one edge (in the drawings, the mounting plate 94 is shown as square, but could take other forms, such as rectangular, round, etc.). At the edge(s), the mounting plate 94 is mounted to the lateral support member 28a, the longitudinal support member 30a and the intermediate lateral support member 32 proximate to their upper ends (the lateral support member 28a, the longitudinal support member 30a and the intermediate lateral support member 32 form the walls of the pocket 100). If desired, the upper surface of the mounting plate 94 may be flush with the upper surfaces of the members 28a, 30a, 32. The first rail 96 is mounted to the bottom surface of the lateral support member 28a, and the second rail 98 is mounted to the bottom surface of the intermediate lateral support member 32. The rails 96, 98 extend into the space between the members 28a, 32 such that the three-sided pocket 100 is formed by the members 28a, 30a, 32 (which form the side walls of the pocket 100) and the rails 96, 98. If intermediate longitudinal support members are provided instead of intermediate lateral support members in the cart 20, then at the edge(s), the mounting plate 94 is mounted to the lateral support member, to the longitudinal support member and to the intermediate longitudinal member (these members form the walls of the pocket 100); the pair of rails 96, 98 are mounted to the bottom surfaces of the longitudinal member and the intermediate longitudinal member; and the rails 96, 98 extend into the space between the members such that the three-sided pocket 100 is formed by the lateral member, the longitudinal member, the intermediate longitudinal member and the rails 96, 98. A free edge 94a of the mounting plate 94 is thus provided.

Figure 13:
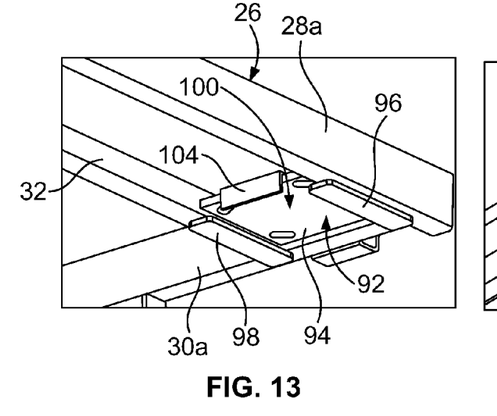
FIG. 13 is a bottom perspective view of a first embodiment of a caster mounting interface provided on the industrial cart for mounting a wheel caster to the industrial cart.
Figure 13A:
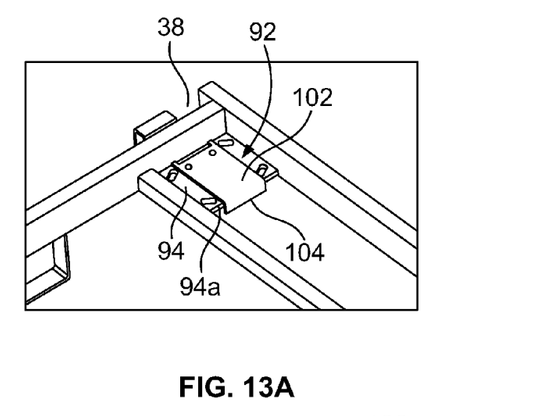
FIG. 13A is a top perspective view of the first embodiment of the caster mounting interface of FIG. 13.
Figure 13B:
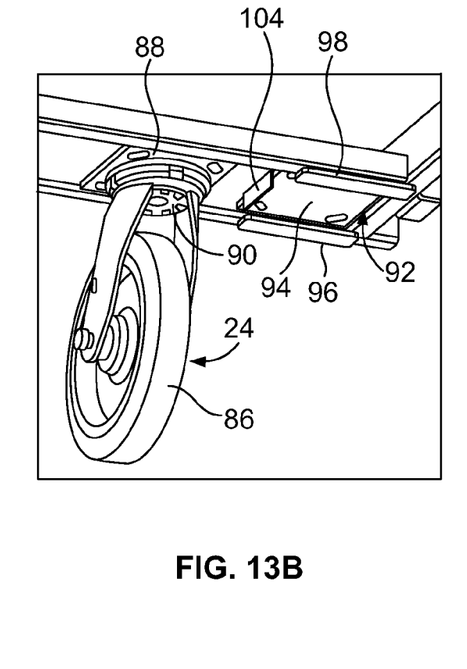
FIG. 13B is a bottom perspective view of the first embodiment of the caster mounting interface of FIG. 13 showing the wheel caster being mounted thereto.
Figure 13C:
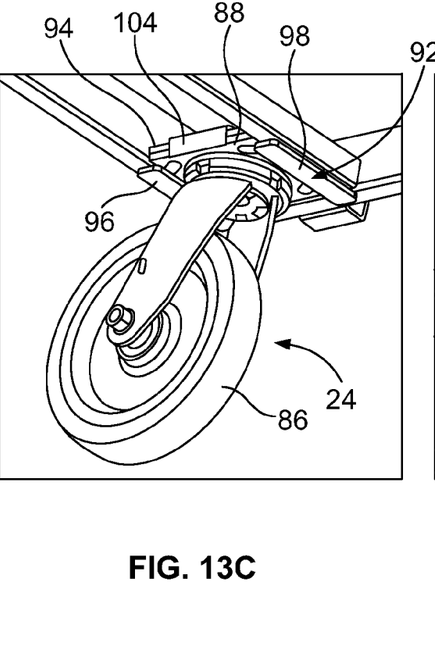
FIG. 13C is a bottom perspective view of the first embodiment of the caster mounting interface of FIG. 13 showing the wheel caster mounted thereto.
Figure 13D:
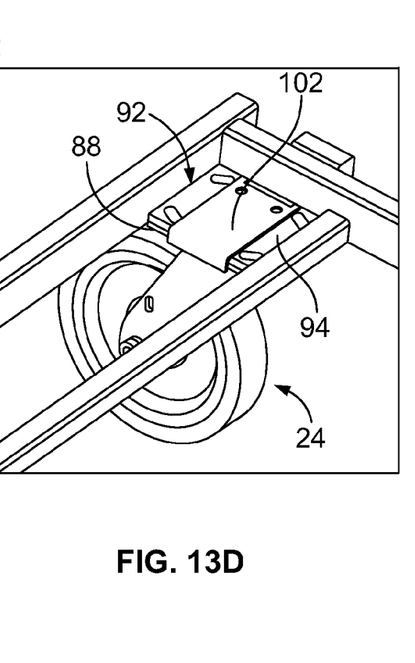
FIG. 13D is a top perspective view of the first embodiment of the caster mounting interface of FIG. 13 showing the wheel caster mounted thereto.

As shown in FIGS. 13-13D, the caster mounting interface 92 includes a flexible arm member 102 having a hook end 104 which overhangs the free edge 94a of the mounting plate 94. The arm member 102 can be made of spring steel. The end of the arm member 102 is attached to the upper surface of the flat mounting plate 94, either by welding or by fasteners. The arm member 102 can be flexed such that the hook end 103 is positioned in the upper position or in the lower position.

As shown in FIGS. 13B-13D, the caster 24 is assembled with the caster mounting interface 92 by sliding the caster plate 88 of the caster 24 toward the arm member 102 and engaging the hook end 104. Because of the hook end 104, the arm member 102 flexes upwardly upon contact with the caster plate 88. This allows the caster plate 88 to slide between the rails 96, 98 and the mounting plate 94 and to enter into the pocket 100. After the caster plate 88 is fully inserted into the pocket 100 such that the caster plate 88 aligns with the mounting plate 94 and does not engage with the arm member 102, the arm member 102 returns to its unflexed lower position. In this lower position, the arm member 102 prevents the removal of the caster 24 as the caster 24 is now restrained on all four sides in the pocket 100.

The caster 24 can be easily removed from the pocket 100 by flexing the arm member 102 until it is positioned in its upper position, and sliding the caster 24 outwardly from the pocket 100.

Figure 14:
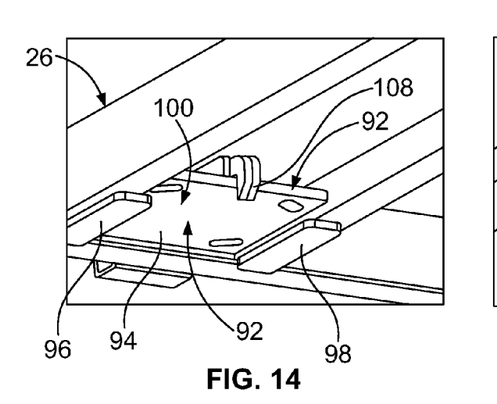
FIG. 14 is a bottom perspective view of a second embodiment of a caster mounting interface provided on the industrial cart for mounting a wheel caster to the industrial cart.
Figure 14A:
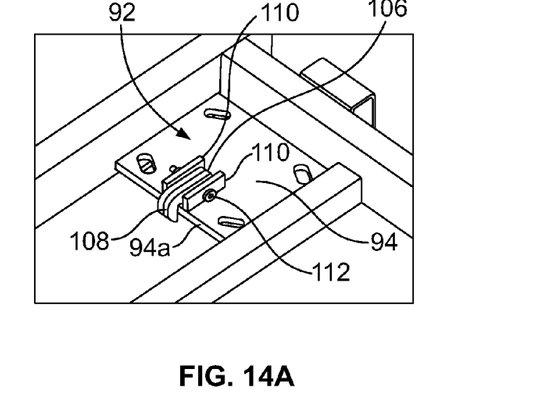
FIG. 14A is a top perspective view of the second embodiment of the caster mounting interface of FIG. 14.

As shown in FIGS. 14 and 14A, the caster mounting interface 92 includes a rotatable member 106 having a hook end 108 which is mounted in a housing 110 that is attached to the upper surface of the mounting plate 94. The housing 110 may take the form of a pair of flanges, as shown, extending upwardly from the upper surface of the mounting plate 94. A pivot pin 112 extends through the housing 110 and the member 106 to provide for rotation of the member 106 relative to the housing 110 and the mounting plate 94. The hook end 108 of the member 106 overhangs the free edge 94a of the mounting plate 94. The member 106 can be rotated to be positioned in the upper position or in the lower position.

To assemble the caster 24 with the caster mounting interface 92, the caster plate 88 is slid toward the member 106 and engages the hook end 108. Because of the hook end 108, the member 106 rotates upwardly upon contact with the caster plate 88. This allows the caster plate 88 to slide between the rails 96, 98 and the mounting plate 94 and to enter into the pocket 100. After the caster plate 88 is fully inserted into the pocket 100 such that it aligns with the mounting plate 94 and does not engage with the member 106, the member 106 rotates to its lower position. In this lower position, the member 106 prevents the removal of the caster 24 as the caster 24 is now restrained on all four sides in the pocket 100. The member 106 can rely upon gravity to hold the lower position of the member 106, or the member 106 can be positively mechanically loaded, such as by spring-loading, to maintain the lower position of the member 106.

The caster 24 can be easily removed from the pocket 100 by rotating the member 106 until it is positioned in its upper position, and sliding the caster 24 outwardly from the pocket 100.

Figure 15:
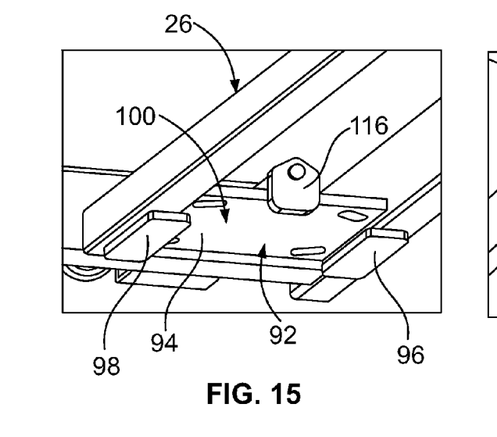
FIG. 15 is a bottom perspective view of a third embodiment of a caster mounting interface provided on the industrial cart for mounting a wheel caster to the industrial cart.
Figure 15A:
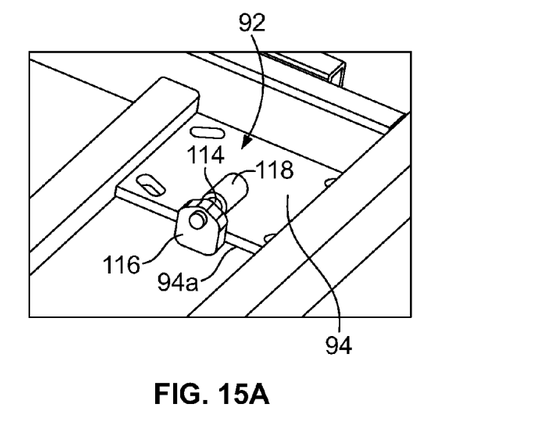
FIG. 15A is a top perspective view of the third embodiment of the caster mounting interface of FIG. 15.

As shown in FIGS. 15 and 15A, the caster mounting interface 92 includes a rotatable member 114 having an enlarged head 116, the member 114 is mounted in a housing 118 that is attached to the upper surface of the mounting plate 94. The enlarged head 116 of the member 114 overhangs the free edge 94a of the mounting plate 94. The member 114 can be rotated to be in the upper position or in the lower position.

To assemble the caster 24 with the caster mounting interface 92, the enlarged head 116 is positioned such that it is in its upper position. The caster plate 88 is slid between the rails 96, 98 and the mounting plate 94 to enter into the pocket 100. After the caster plate 88 is fully inserted into the pocket 100 such that it aligns with the mounting plate 94, the member 114 is rotated such that the enlarged head 116 is in its lower position. In this lower position, the enlarged head 116 prevents the removal of the caster 24 as the caster 24 is now restrained on all four sides in the pocket 100. The member 114 can rely upon gravity to hold the lower position of the enlarged head 116, or the member 114 can be positively mechanically loaded, such as by spring-loading, to maintain the lower position of the enlarged head 116.

The caster 24 can be easily removed from the pocket 100 by rotating the enlarged head 116 until it is positioned in its upper position, and sliding the caster 24 outwardly from the pocket 100.

Figure 16:
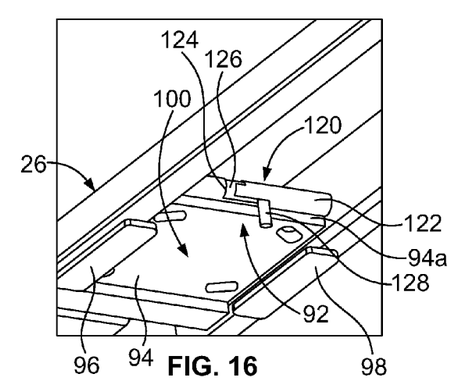
FIG. 16 is a bottom perspective view of a fourth embodiment of a caster mounting interface provided on the industrial cart for mounting a wheel caster to the industrial cart.
Figure 16A:
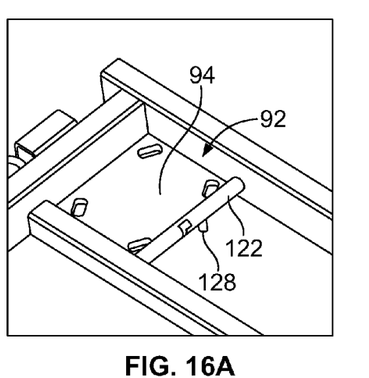
FIG. 16A is a top perspective view of the fourth embodiment of the caster mounting interface of FIG. 16.

As shown in FIGS. 16 and 16A, the caster mounting interface 92 includes a member 120 formed of a slide bolt attached to the free edge 94a of the mounting plate 94. The slide bolt is conventionally formed and has an outer tubular housing 122 with a slot 124 therethrough, and an internal slide 126, which can be spring-loaded, and which has a protrusion 128 extending through the slot 124. The slot 124 allows the protrusion 128 to be positioned in the upper position or in the lower position.

To assemble the caster 24 with the caster mounting interface 92, the member 120 is positioned such that the protrusion 128 is in the upper position. The caster plate 88 is slid between the rails 96, 98 and the mounting plate 94 to enter into the pocket 100. After the caster plate 88 is fully inserted into the pocket 100 such that it aligns with the mounting plate 94, the slide 126 is slid such that the protrusion 128 is in its lower position. In this lower position, the member 120 prevents the removal of the caster 24 as the caster 24 is now restrained on all four sides in the pocket 100.

The caster 24 can be easily removed from the pocket 100 by sliding the slide 126 such that the protrusion 128 is positioned in its upper position, and sliding the caster 24 outwardly from the pocket 100.

Figure 17:
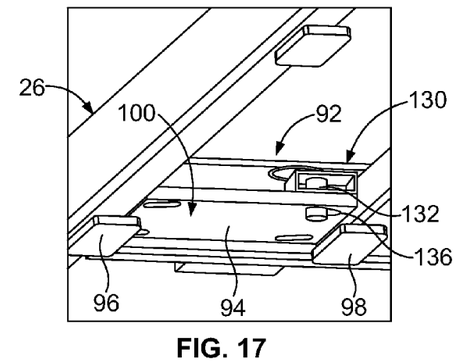
FIG. 17 is a bottom perspective view of a fifth embodiment of a caster mounting interface provided on the industrial cart for mounting a wheel caster to the industrial cart.
Figure 17A:
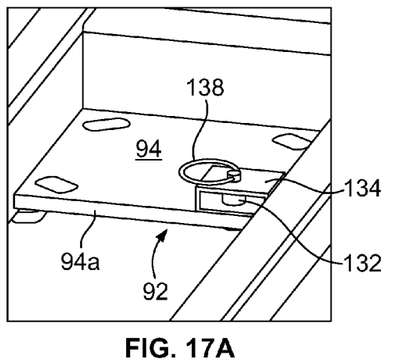
FIG. 17A is a top perspective view of the fifth embodiment of the caster mounting interface of FIG. 17.

As shown in FIGS. 17 and 17A, the caster mounting interface 92 includes a member 130 formed of a spring-loaded pin 132 attached to the upper surface of the plate 92 via a housing 134. The member 130 is proximate to the free edge 94a of the mounting plate 94. An aperture 136 is provided through the mounting plate 94 to allow the pin 132 to extend therethrough. The housing 134 is generally U-shaped and the pin 132 extends through the top surface thereof. A handle 138 in the form of a grip ring is attached to the upper end of the pin 132. The pin 132 can be refracted to be in the upper position by pulling the handle 138 upwardly to move the free end of the pin 132 upwardly, or in the lower position by releasing the handle 138.

To assemble the caster 24 with the caster mounting interface 92, the pin 132 is pulled via handle 138 such that the pin 132 is in its upper position. The caster plate 88 is slid between the rails 96, 98 and the mounting plate 94 to enter into the pocket 100. After the caster plate 88 is fully inserted into the pocket 100 such that it aligns with the mounting plate 94, the handle 138 is released such that the pin 132 moves into its lower position and enters into an aligned hole in the caster plate 24. In this lower position, the pin 132 prevents the removal of the caster 24 as the caster 24 is now restrained on all four sides in the pocket 100.

The caster 24 can be easily removed from the pocket 100 by pulling the pin 132 to its upper position, and sliding the caster 24 outwardly from the pocket 100.

Figure 18:
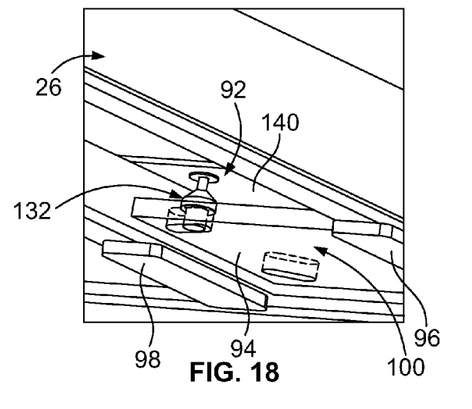
FIG. 18 is a bottom perspective view of a sixth embodiment of a caster mounting interface provided on the industrial cart for mounting a wheel caster to the industrial cart.
Figure 18A:
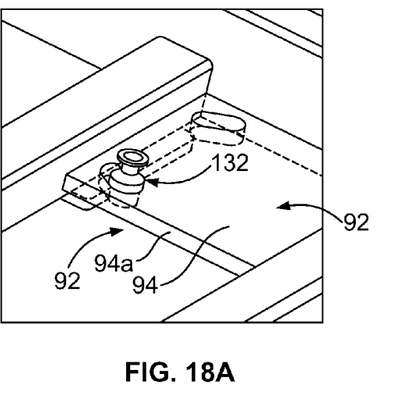
FIG. 18A is a top perspective view of the sixth embodiment of the caster mounting interface of FIG. 18.

In the embodiment shown in FIGS. 18 and 18A, the spring-loaded pin 132 is instead welded to the frame 26; the frame 26 has a housing 140 formed of a flange extending outwardly from the members (for example member 26) extending outwardly from the members to which the mounting plate 94 is welded, and the pin 132 operates in the same manner as that of FIGS. 17 and 17A.

Figure 19:
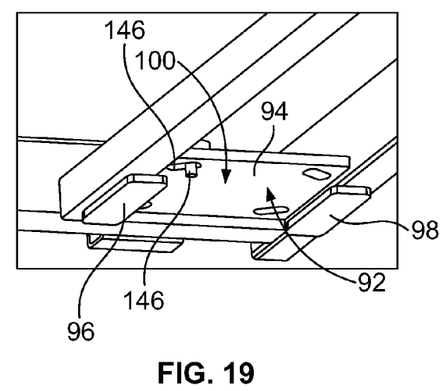
FIG. 19 is a bottom perspective view of a seventh embodiment of a caster mounting interface provided on the industrial cart for mounting a wheel caster to the industrial cart.
Figure 19A:
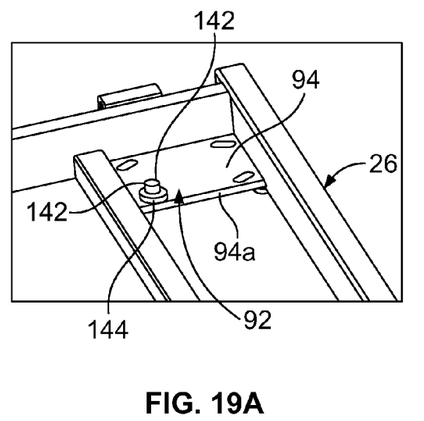
FIG. 19A is a top perspective view of the seventh embodiment of the caster mounting interface of FIG. 19.

As shown in FIGS. 19 and 19A, the caster mounting interface 92 includes a member 142 formed from a detachable pin that has a first portion 142 and an enlarged second portion 144. The member 142 seats through an aperture 146 in the mounting plate 94 which is proximate to the free edge 94a, such that a section 146 of the first portion 142 extends below the bottom surface of the mounting plate 94. The enlarged second portion 144 is larger than the aperture 146 so that it cannot pass therethrough. The member 142 is a magnet such that it stays attached to the metal mounting plate 94. The member 142 can be moved relative to the mounting plate 94 to the upper position, or can be inserted into and through the aperture 146 to be in the lower position such that the section 146 extends into the pocket 100.

To assemble the caster 24 with the caster mounting interface 92, the member 142 is moved to be in its upper position. The caster plate 88 is slid between the rails 96, 98 and the mounting plate 94 to enter into the pocket 100. After the caster plate 88 is fully inserted into the pocket 100 such that it aligns with the mounting plate 94, the member 142 is moved to its lower position by being inserted through the mounting plate 94 and into an aperture in the caster plate 88 or abutting against the end of the caster plate 88. In this lower position, the member 142 prevents the removal of the caster 24 as the caster 24 is now restrained on all four sides in the pocket 100.

The caster 24 can be easily removed from the pocket 100 by removing the member 142, and sliding the caster 24 outwardly from the pocket 100.

Figure 20:
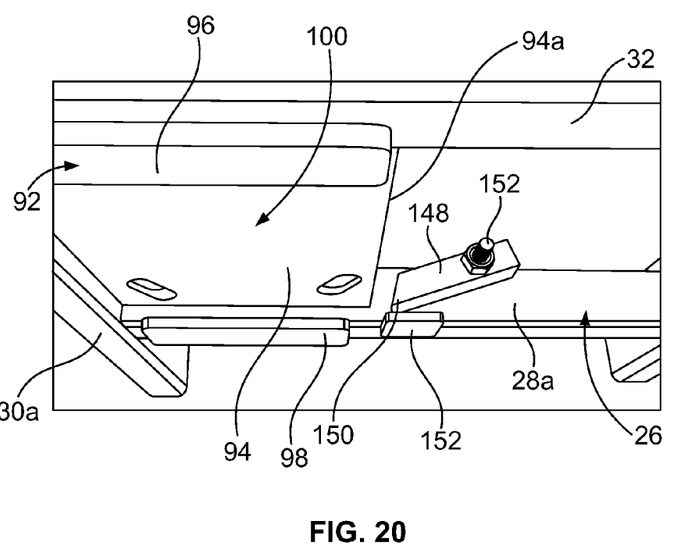
FIG. 20 is a bottom perspective view of an eight embodiment of a caster mounting interface provided on the industrial cart for mounting a wheel caster to the industrial cart.

As shown in FIG. 20, the caster mounting interface 92 includes a member 148 having a hook-like end 150 that is rotatably attached to the frame 26, for example lateral support member 28a, via a pivot pin 152. The pivot pin 152 is proximate to the upper edge of the component of the frame 26 to which it is mounted. The hook-like end 150 of the member 148 is proximate to the free edge 94a of the mounting plate 94. The member 148 can be rotated to be positioned in the upper position or in the lower position. A stop 152 is attached to the same component of the frame 26, for example lateral support member 28a, to which the member 148 is attached to stop the rotation of the member 148.

To assemble the caster 24 with the caster mounting interface 92, the caster plate 88 is slid toward the member 148 and engages the member 148. Because of this engagement, the member 148 rotates to its upper position upon contact with the caster plate 88. This allows the caster plate 88 to slide between the stop 152 and the member 148, and further between the rails 96, 98 and the mounting plate 94 to enter into the pocket 100. After the caster plate 88 is fully inserted into the pocket 100 such that it aligns with the mounting plate 94 and does not engage with the member 148, the member 148 rotates to its lower position and abuts the stop 152. In this lower position, the member 148 prevents the removal of the caster 24 as the caster 24 is now restrained on all four sides in the pocket 100. The member 148 can rely upon gravity to hold its lower position, or the member 148 can be positively mechanically loaded, such as by spring-loading, to maintain the lower position of the member 148.

The caster 24 can be easily removed from the pocket 100 by rotating the member 148 until it is positioned in its upper position, and sliding the caster 24 outwardly from the pocket 100.

In each embodiment, the flat caster plate 88 and the flat mounting plate 94 have apertures therethrough (some of which are used in the some of the embodiments as described hereinabove). These apertures align when the flat caster plate 88 is mounted in the pocket 100. These apertures can be used to permanently mount the caster plate 88 to the mounting plate 94 such that the caster 24 is permanently mounted to the frame 26, if desired.

The casters 24 and the caster mounting interface 92 can be provided at the corners of the cart 20 and can be provided mid-mount along the cart 20. This provides more options for greater mobility.

The ability to quickly exchange casters 24 and accessories 222a-222f to adapt to the work environment and task at hand as well as easily disassemble for compact, convenient storage and transportation differentiate this industrial cart 20 from current industrial carts found in the marketplace. Additionally, the design of the industrial cart 20 provides for a load rating that exceeds normal competitive models of carts, as well as features that provide easy lifting by fork truck or crane.

While preferred embodiments of the present invention are shown and described, it is envisioned that those skilled in the art may devise various modifications of the present invention without departing from the spirit and scope of the appended claims.

What is claimed is:

1. An industrial cart comprising:
a frame including first and second lateral support members, first and second longitudinal support members and first and second retaining blocks,
each lateral support member having first and second ends,
each longitudinal support member having first and second ends, the first end of the first longitudinal support member connected with the first lateral support member at a position which is spaced from the first end of the first lateral support member, the second end of the first longitudinal support member connected with the second lateral support member, the first end of the second longitudinal support member connected with the first lateral support member at a position which is spaced from the second end of the first lateral support member, the second end of the second longitudinal support member connected with the second lateral support member,
the first retaining block extending from the first longitudinal support member, the first retaining block positioned proximate to, but spaced from, the first end of the first longitudinal support member such that a first space is formed between the first retaining block and the first lateral support member,
the second retaining block extending from the second longitudinal support member, the second retaining block positioned proximate to, but spaced from, the first end of the second longitudinal support member such that a second space is formed between the second retaining block and the first lateral support member, the second retaining block having a passageway therethrough which is in direct communication with the second space; and
a locking mechanism attached to the second retaining block, the locking mechanism extending through the passageway such that the locking mechanism is capable of entering into the second space and capable of being withdrawn from the second space.

2. The industrial cart of claim 1, wherein said locking mechanism comprises a spring-loaded pin mounted in the passageway of the second retaining block.

3. The industrial cart of claim 1, further comprising:
a third retaining block extending from said first longitudinal support member, said third retaining block positioned proximate to, but spaced from, the second end of said first longitudinal support member such that a third space is formed between said third retaining block and the second lateral support member;
a fourth retaining block extending from said second longitudinal support member, said fourth retaining block positioned proximate to, but spaced from, the second end of said second longitudinal support member such that a fourth space is formed between said fourth retaining block and second lateral support member; and
a second locking mechanism attached to one of said third and fourth retaining blocks.

4. The industrial cart of claim 3, wherein each said locking mechanism comprises a spring-loaded pin.

5. The industrial cart of claim 1, further comprising spaced-apart intermediate lateral support members aye provided between the lateral support members, each intermediate lateral support member having first and second ends, the ends of the intermediate lateral support members being connected to the longitudinal support members.

6. The industrial cart of claim 1, further comprising a rotatable fastener mounted to the first retaining block, the fastener capable of being rotated to move an end of the fastener into and out of the first space.

7. A combination of an industrial cart and an accessory comprising:
the industrial cart comprising a frame having first and second lateral support members, first and second longitudinal support members and first and second retaining blocks, each lateral support member having first and second ends, each longitudinal support member having first and second ends, the first end of the first longitudinal support member connected with the first lateral support member at a position which is spaced from the first end of the first lateral support member, the second end of the first longitudinal support member connected with the second lateral support member, the first end of the second longitudinal support member connected with the first lateral support member at a position which is spaced from the second end of the first lateral support member, the second end of the second longitudinal support member connected with the second lateral support member, said first retaining block extending from said first longitudinal support member and positioned proximate to, but spaced from, the first end of said first longitudinal support member such that a first space is formed between said first retaining block and the first lateral support member, said second retaining block extending from said second longitudinal support member and positioned proximate to, but spaced from, the first end of said second longitudinal support member such that a second space is formed between said second retaining block and the first lateral support member;
said accessory comprising first and second upright legs attached to each other by a first cross leg, said first upright leg seats in said first space and said second upright leg seats in said second space; and
a locking mechanism, wherein in use, said locking mechanism is engaged between the second retaining block to the second upright leg to lock the accessory to the industrial cart, said locking mechanism can be disengaged to remove said accessory from the industrial cart.

8. The combination of claim 7, wherein said locking mechanism remains attached to said accessory when the locking mechanism is disengaged.

9. The combination of claim 8, wherein said locking mechanism comprises a hook attached to said second upright leg, said hook capable of pivoting relative to said second upright leg, wherein in use, said hook pivots to engage with said second retaining block.

10. The combination of claim 7, wherein said locking mechanism remains attached to said retaining block when the locking mechanism is disengaged.

11. The combination of claim 10, wherein said locking mechanism comprises a spring-loaded pin attached to the second retaining block, said pin capable of bearing against said second upright leg.

12. The combination of claim 10, wherein said pin has a tapered upper surface configured to engage a lower end of said second upright leg when said second upright leg is being inserted into said second space.

13. The combination of claim 7, wherein said cross leg of said accessory is provided at the lower ends of the upright legs, and an intermediate upright post extends from said cross leg, said intermediate upright post having a plurality of arms extending outwardly therefrom configured to hang objects thereon.

14. The combination of claim 13, wherein a support is provided at a midpoint of the cross leg, and said intermediate upright post extends from said support.

15. The combination of claim 13, wherein a second accessory is provided, said second accessory being identical to said first-defined accessory, and further including at least one mount provided on each said intermediate upright post, and a rail attached to and extending between said mounts, at least one wire cart arm mounted on said rail.

16. The combination of claim 15, wherein said at least one wire cart arm is movable along said rail.

17. The combination of claim 15, wherein a handle is attached to said accessory.

18. The combination of claim 13, wherein a second accessory is provided, said second accessory being identical to said first-defined accessory, and further including a first mount provided on each said intermediate upright post, a first rail attached to and extending between said first mounts, at least one wire cart arm mounted on said first rail, a second mount provided on each said intermediate upright post, each said second mount being spaced from said first mount, a second rail attached to and extending between said second mounts, at least one wire cart arm mounted on said second rail.

19. The combination of claim 18, wherein said at least one wire cart arm mounted on said first rail is movable along said first rail, and said at least one wire cart arm mounted on said second rail is movable along said second rail.

20. The combination of claim 18, wherein a handle is attached to said accessory.

21. The combination of claim 7, wherein each said upright leg of said accessory has a lower portion which extends perpendicular to the frame and an upper portion which is angled relative to the lower portion, said cross leg extending between the upright legs at an upper end of the lower portions.

22. The combination of claim 7, wherein said accessory includes third and fourth upright legs, and forms a basket structure.

23. The combination of claim 22, wherein said first cross leg is provided at the upper end of said first and second upright legs, said third upright leg has upper and lower ends, said fourth upright leg has upper and lower ends, a second cross leg is provided at the upper ends of the third and fourth cross legs, a third cross leg is provided at the upper ends of the first and third cross legs, a fourth cross leg is provided at the upper ends of the first and fourth cross legs, a first mesh side is provided between said first and second upright legs, a second mesh side is provided between said third and fourth upright legs, a third mesh side is provided between said first and third upright legs, and a fourth mesh side is provided between said second and fourth upright legs.

24. The combination of claim 7, wherein said accessory further includes third and fourth upright legs, and a plurality of shelves extending between said first, second, third and fourth upright legs.

25. The combination of claim 7, wherein said first cross leg is provided spaced from the lower ends of the first and second uprights legs, said accessory further includes a third upright leg having upper and lower ends, a fourth upright leg having upper and lower ends, and a second cross bar extending between said third and fourth upright legs, said second cross leg is provided spaced from the lower ends of the third and fourth uprights legs.

26. The combination of claim 7, further comprising:
   a third retaining block extending from the first longitudinal support member, the third retaining block positioned proximate to, but spaced from, the second end of the first longitudinal support member such that a third space is formed between the third retaining block and the second lateral support member, and
   a fourth retaining block extending from the second longitudinal support member, the fourth retaining block positioned proximate to, but spaced from, the second end of the second longitudinal support member such that a fourth space is formed between the fourth retaining block and second lateral support member.

27. The combination of claim 26, further including a first locking mechanism attached to the first retaining block, and a second locking mechanism attached to one of the third and fourth retaining blocks.

28. The combination of claim 7, further comprising a foot extending outwardly from the first upright leg, wherein in use, the foot engages with the first retaining block and one of the extending portions.

29. The combination of claim 28, wherein the foot of the first upright leg is at a lower end thereof.

30. An industrial cart comprising:
   a frame including first and second lateral support members, first and second longitudinal support members and first and second retaining blocks,
   each lateral support member having first and second ends,
   each longitudinal support member having first and second ends, the first end of the first longitudinal support member connected with the first lateral support member at a position which is spaced from the first end of the first lateral support member, the second end of the first longitudinal support member connected with the second lateral support member, the first end of the second longitudinal support member connected with the first lateral support member at a position which is spaced from the second end of the first lateral support member, the second end of the second longitudinal support member connected with the second lateral support member,
   the first retaining block extending from the first longitudinal support member, the first retaining block positioned proximate to, but spaced from, the first end of the first longitudinal support member such that a first space is formed between the first retaining block and the first lateral support member,
   the second retaining block extending from the second longitudinal support member, the second retaining block positioned proximate to, but spaced from, the first end of the second longitudinal support member such that a second space is formed between the second retaining block and the first lateral support member, the second retaining block having a passageway therethrough which is in direct communication with the second space; and
   a rotatable fastener mounted through the passageway of the second retaining block, the fastener being rotatable relative to the second retaining block such that an end of the fastener can enter into and out of the second space.

31. The industrial cart of claim 30, wherein the first retaining block has a passageway therethrough which is in direct communication with the first space; and a second rotatable fastener is mounted through the passageway of the first retaining block, the second fastener being rotatable relative to the first retaining block such that an end of the second fastener can enter into and out of the first space.

* * * * *